(12) United States Patent
Baudasse et al.

(10) Patent No.: US 9,718,639 B2
(45) Date of Patent: Aug. 1, 2017

(54) DEVICE FOR UNFURLING AND REFURLING A FLEXIBLE STRUCTURE, AND A FLEXIBLE UNFURLABLE STRUCTURE AND SATELLITE BOTH EQUIPPED WITH SUCH A DEVICE

(71) Applicants: THALES, Neuilly-sur-Seine (FR); CENTRE NATIONAL D'ETUDES SPATIALES—CNES, Paris (FR)

(72) Inventors: Yannick Baudasse, Cannes-la-Bocca (FR); Stephane Vezain, Cannes-la-Bocca (FR); Bernard Boulanger, Cannes-la-Bocca (FR); Francois Guinot, Cannes-la-Bocca (FR)

(73) Assignees: THALES, Courbevoie (FR); CENTRE NATIONAL D'ETUDES SPATIALES, Paris (FR)

( * ) Notice: Subject to any disclaimer, the term of this patent is extended or adjusted under 35 U.S.C. 154(b) by 631 days.

(21) Appl. No.: 14/094,340

(22) Filed: Dec. 2, 2013

(65) Prior Publication Data

US 2014/0151485 A1 Jun. 5, 2014

(30) Foreign Application Priority Data

Dec. 5, 2012 (FR) ...................................... 12 03300

(51) Int. Cl.
*B65H 75/34* (2006.01)
*B64G 1/22* (2006.01)
(Continued)

(52) U.S. Cl.
CPC ............. *B65H 75/34* (2013.01); *B64G 1/222* (2013.01); *B64G 1/44* (2013.01); *B64G 1/503* (2013.01); *B64G 1/66* (2013.01)

(58) Field of Classification Search
CPC .......... B65H 75/34; B64G 1/44; B64G 1/443; B64G 1/222; B64G 1/50; B64G 1/503; Y10S 136/292
See application file for complete search history.

(56) References Cited

U.S. PATENT DOCUMENTS 3,473,758 A * 10/1969 Valentijn ................ B64G 1/222
                                                      136/245
3,477,662 A * 11/1969 Anderson .............. B64G 1/222
                                                      136/245
(Continued)

FOREIGN PATENT DOCUMENTS

EP 0319921 A2 6/1989
EP 1236643 A2 9/2002
FR 2868094 A1 9/2005

*Primary Examiner* — Emmanuel M Marcelo
*Assistant Examiner* — Michael Gallion
(74) *Attorney, Agent, or Firm* — Baker and Hostetler LLP

(57) ABSTRACT

A device is provided for unfurling and refurling comprising at least one tape spring having an axis of unfurling and of refurling parallel to an axis X and a rotor capable of rotating about an axis Y perpendicular to the axis X, the tape spring being able, autonomously, to pass from a state in which it is wound around the rotor to an unwound state. The tape spring is mounted bent in two in the shape of a U and comprises a first end fixed rigidly to a first anchor point that may be secured to a stator or to the rotor and a second end wound around the rotor.

25 Claims, 19 Drawing Sheets

(51) Int. Cl.
*B64G 1/44* (2006.01)
*B64G 1/50* (2006.01)
*B64G 1/66* (2006.01)

(56) References Cited

U.S. PATENT DOCUMENTS

| | | | | |
|---|---|---|---|---|
| 3,578,271 A * | 5/1971 | Thompson, Jr. | .......... | B64F 1/02 242/407 |
| 3,817,481 A * | 6/1974 | Berks | ............ | B64G 1/222 136/245 |
| 3,863,870 A * | 2/1975 | Andrews | ............ | B64G 1/222 136/245 |
| 4,630,791 A * | 12/1986 | Chapman | ............ | B64G 1/14 136/245 |
| 4,636,579 A * | 1/1987 | Hanak | ............ | H02S 40/38 136/245 |
| 4,991,784 A * | 2/1991 | Schmid | ............ | B64G 9/00 242/390.3 |
| 5,131,955 A * | 7/1992 | Stern | ............ | B64G 1/443 136/245 |
| 5,520,747 A * | 5/1996 | Marks | ............ | B64G 1/222 136/245 |
| 5,833,176 A * | 11/1998 | Rubin | ............ | B64G 1/443 136/245 |
| 6,017,002 A * | 1/2000 | Burke | ............ | B64G 1/222 136/245 |
| 6,547,190 B1 * | 4/2003 | Thompson | ............ | B64G 1/443 136/244 |
| 6,609,683 B2 * | 8/2003 | Bauer | ............ | B64G 1/443 244/168 |
| 6,637,702 B1 * | 10/2003 | McCandless | ............ | B64G 1/222 244/172.6 |
| 7,354,033 B1 * | 4/2008 | Murphey | ............ | B64G 1/222 267/151 |
| 8,683,755 B1 * | 4/2014 | Spence | ............ | B64G 1/222 136/245 |
| 8,894,017 B1 * | 11/2014 | Baghdasarian | ............ | B64G 1/443 136/245 |
| 2002/0112417 A1 * | 8/2002 | Brown | ............ | B64G 1/222 52/108 |
| 2002/0116877 A1 * | 8/2002 | Breitbach | ............ | B64G 1/222 52/2.18 |
| 2007/0262204 A1 * | 11/2007 | Beidleman | ............ | B64G 1/222 244/172.6 |
| 2011/0210209 A1 * | 9/2011 | Taylor | ............ | B64G 1/222 244/172.6 |
| 2012/0167943 A1 * | 7/2012 | Blanchard | ............ | B64G 1/222 136/245 |
| 2012/0167944 A1 * | 7/2012 | Blanchard | ............ | B64G 1/44 136/245 |
| 2013/0118482 A1 * | 5/2013 | Albrecht | ............ | F24J 2/07 126/663 |
| 2016/0023781 A1 * | 1/2016 | Baudasse | ............ | B65H 75/28 52/108 |
| 2016/0024790 A1 * | 1/2016 | Baudasse | ............ | E04C 3/005 52/108 |

* cited by examiner

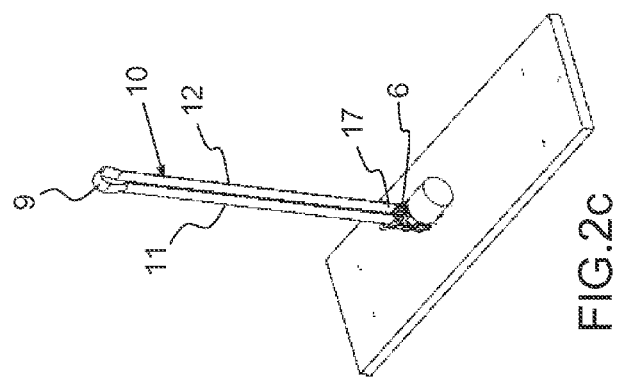
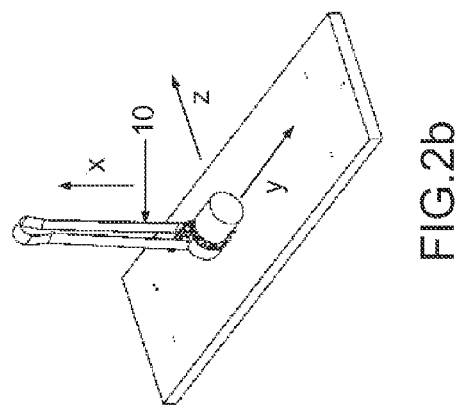
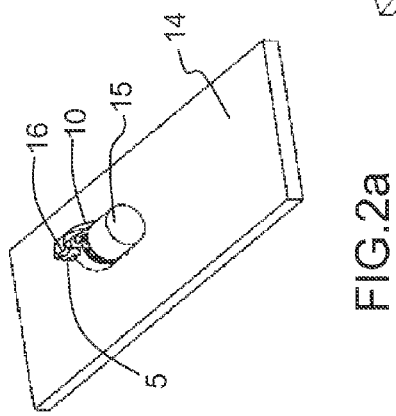
FIG.2c
FIG.2b
FIG.2a

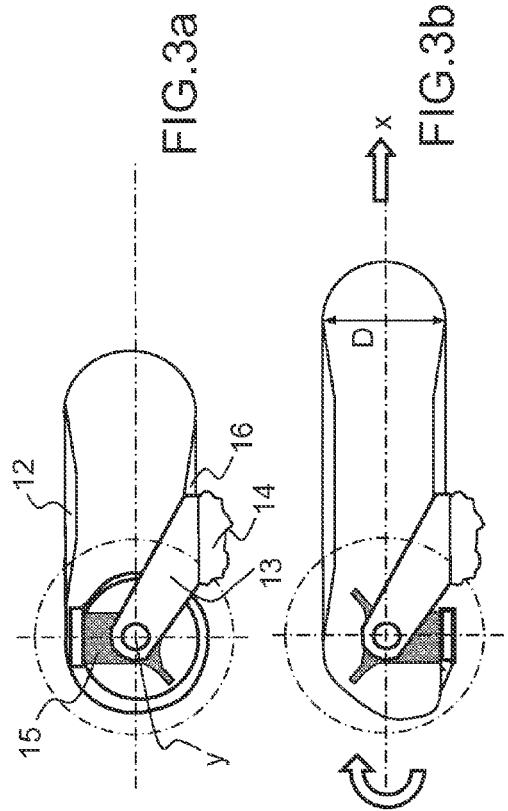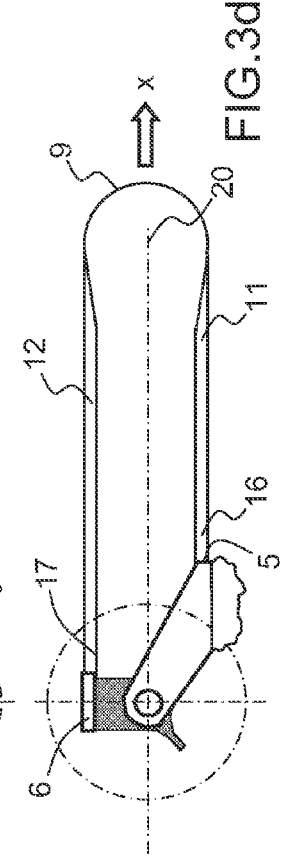

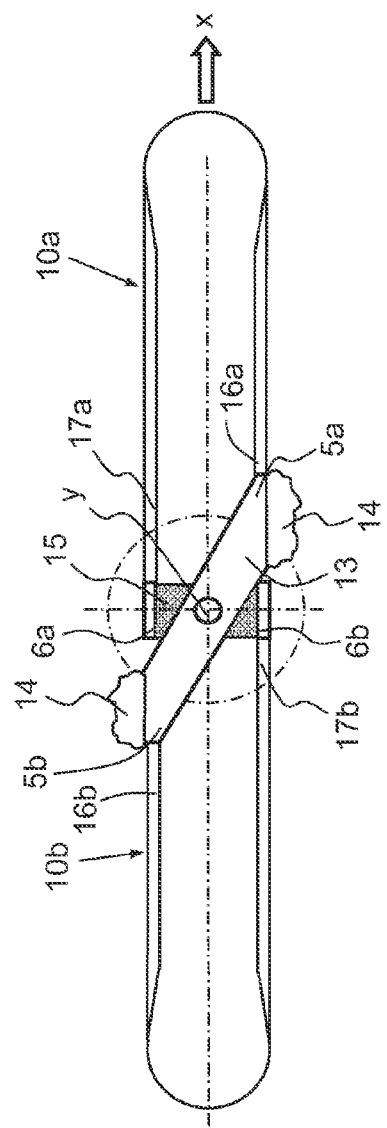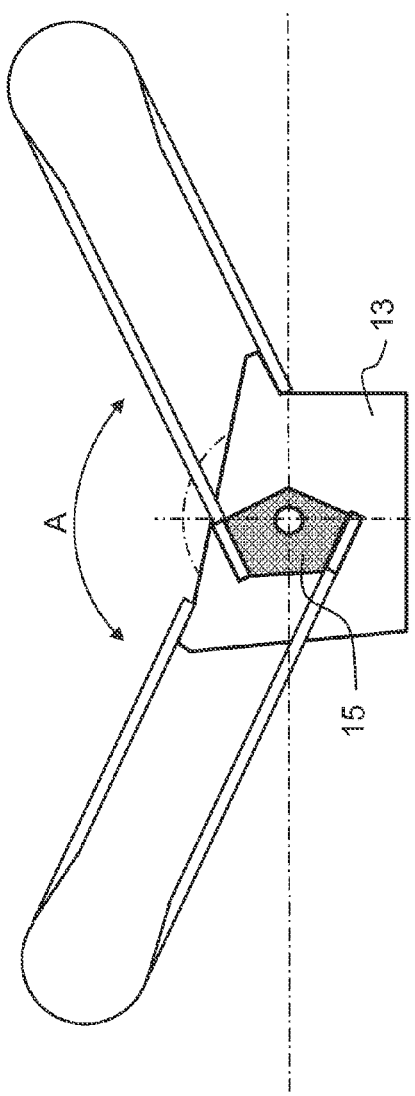

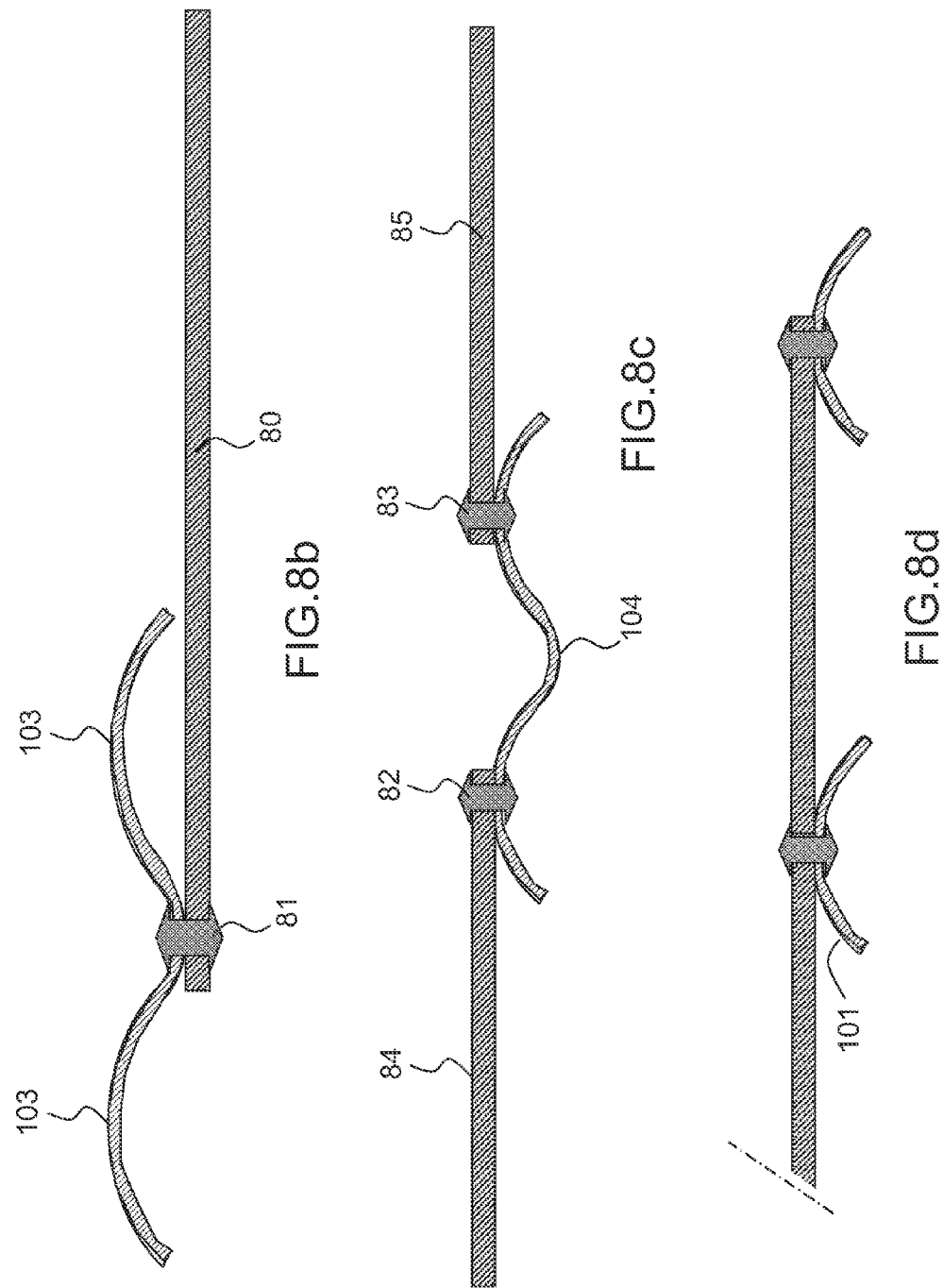

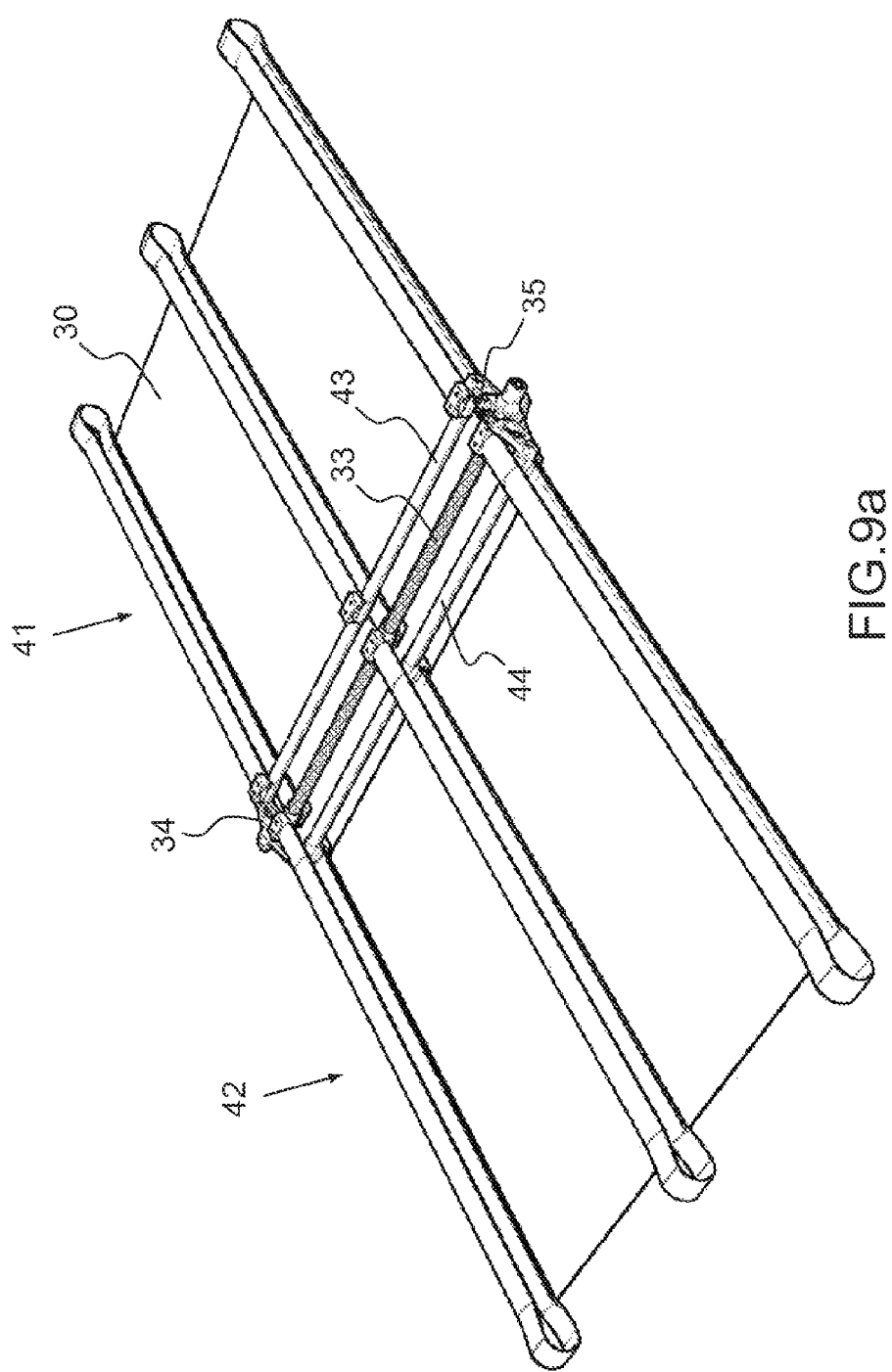

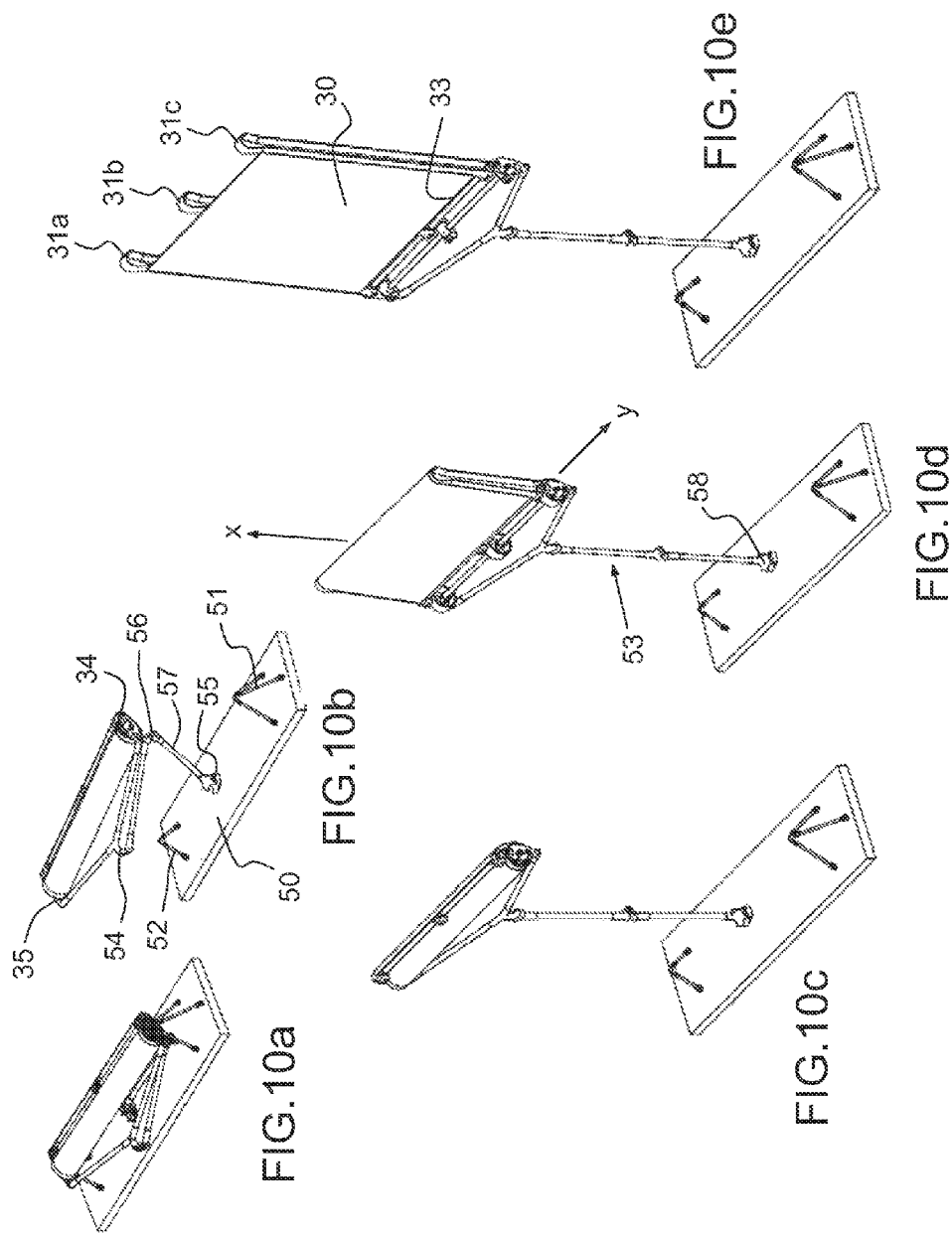

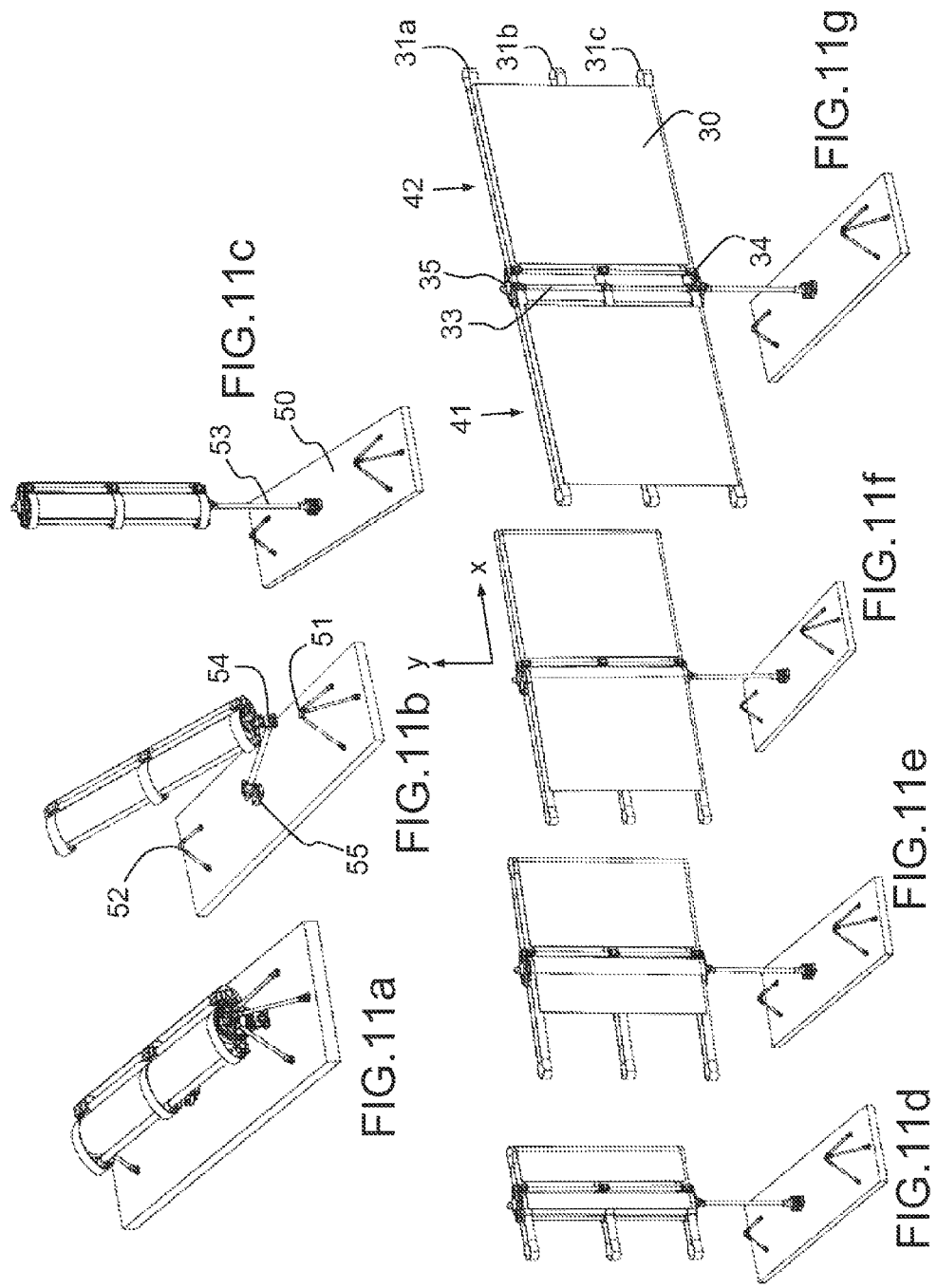

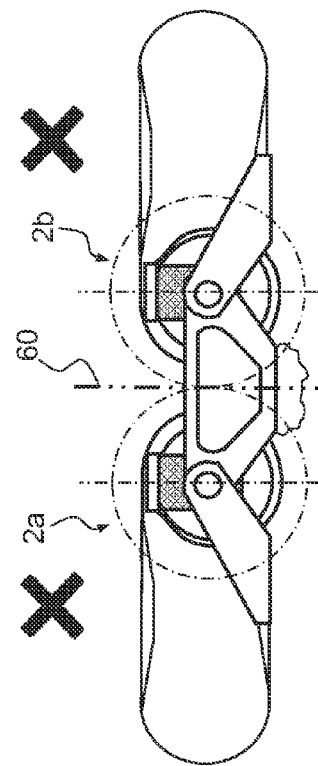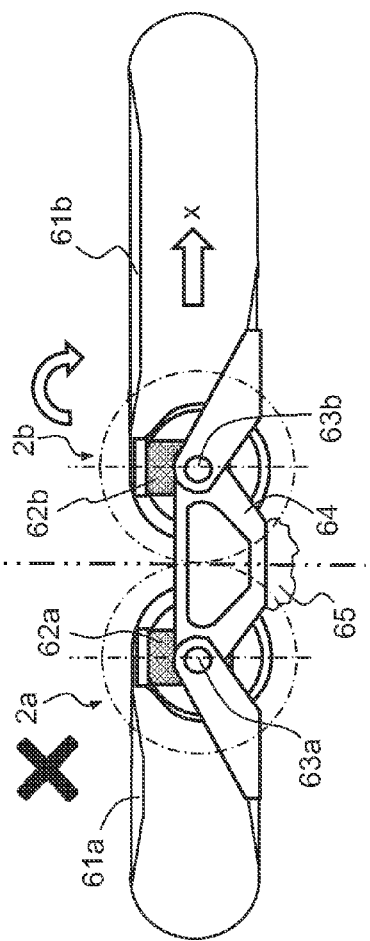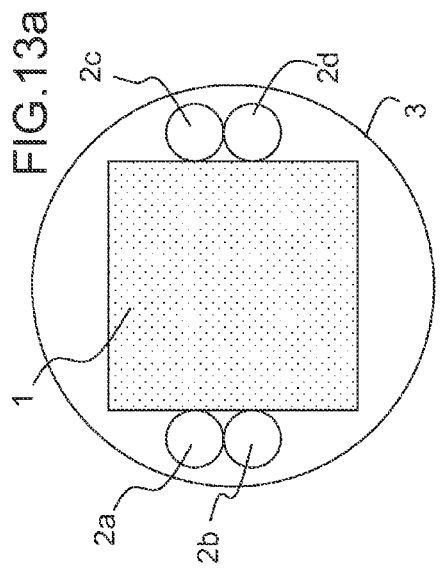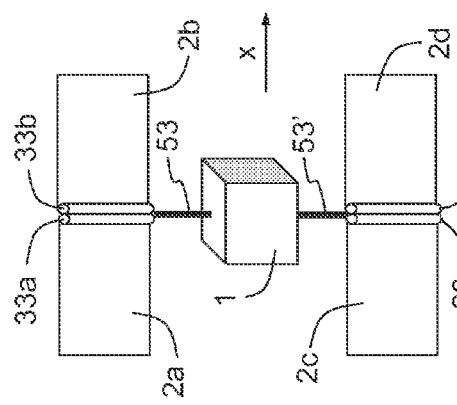

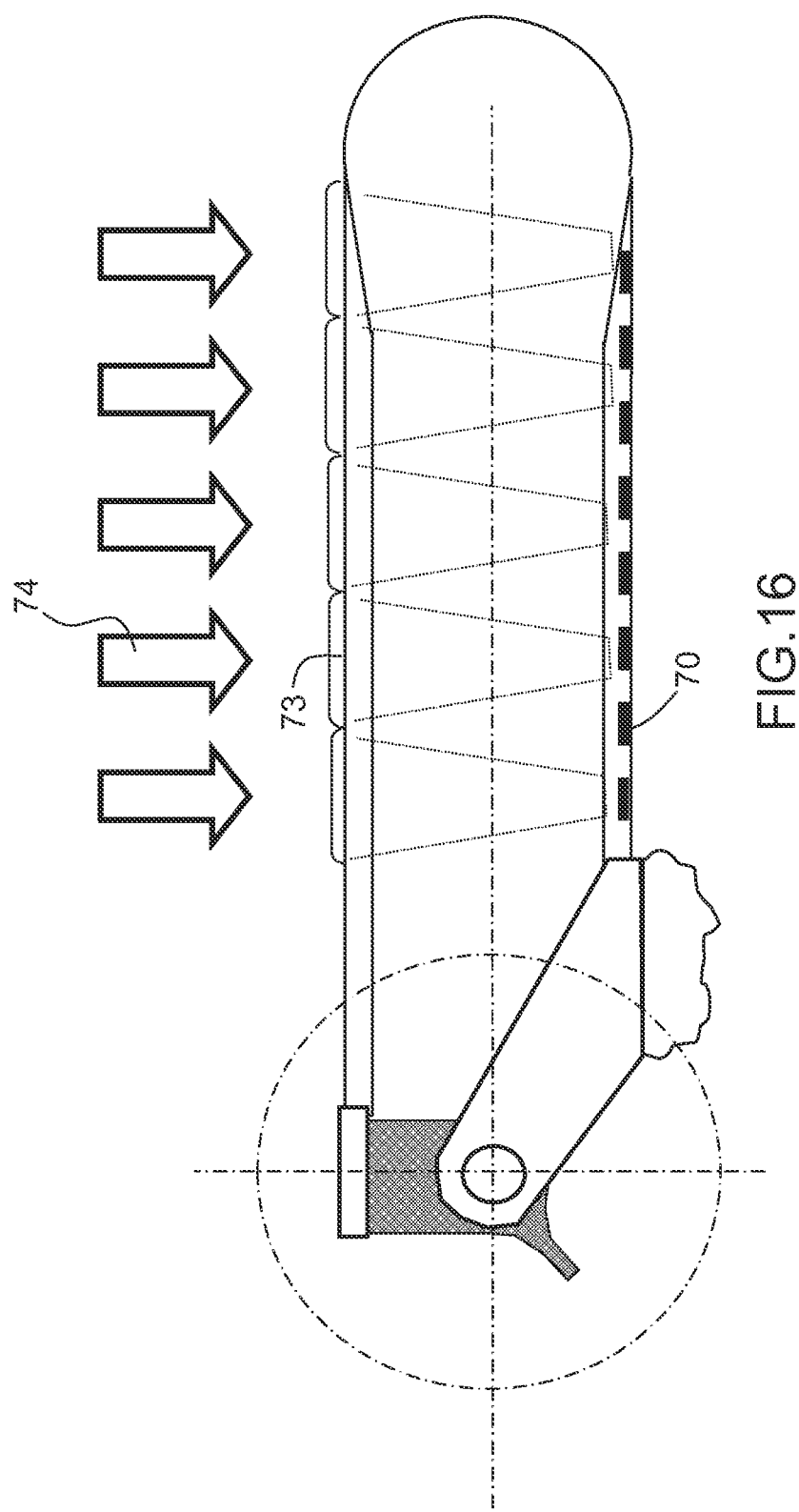

DEVICE FOR UNFURLING AND REFURLING A FLEXIBLE STRUCTURE, AND A FLEXIBLE UNFURLABLE STRUCTURE AND SATELLITE BOTH EQUIPPED WITH SUCH A DEVICE

CROSS-REFERENCE TO RELATED APPLICATION

This application claims priority to foreign French patent application No. FR 1203300, filed on Dec. 5, 2012, the disclosure of which is incorporated by reference in its entirety.

FIELD OF THE INVENTION

The present invention relates to a device for unfurling and refurling a flexible structure, to a flexible unfurlable structure and to a satellite both equipped with such a device. It notably applies to the field of space equipment that has to be unfurled in orbit and, more particularly, to space equipment for satellites, such as antennas, solar arrays, heat screens, baffles or telescopes.

BACKGROUND

Structures that can be unfurled in space, of the solar array type for example, are generally made up of rigid panels articulated to one another, these panels, when in the stored position, being stacked on top of one another. These structures have the advantage of dynamics that are well controlled, but have the disadvantage of high specific mass and high inertia. Further, when in the stored position, the rigid structures occupy a significant amount of space under the fairing of a launcher. Because the space under the fairing of a launcher allocated to the unfurlable structures is limited, it is important to reduce the amount of space required by these unfurlable structures when they are in the stored position in order to optimize the area they can occupy when unfurled.

There are unfurlable flexible planar structures that comprise a flexible sheeting and tape springs which are fixed to one and the same plane of the sheeting. In the stored position, the sheeting and the tape springs are wound around a mandrel. The flexible planar structure is unfurled autonomously by the spontaneous unwinding of the tape springs when the mandrel is freed to rotate.

Indeed, as depicted in FIGS. 1a, 1b, 1c, tape springs are known in the field of space as being flexible tapes with a cross section in the form of a circular arc the radius of curvature of which is convex on a first face and concave on a second face, these tapes being able to pass from the wound state into the unwound state essentially as a result of their own stored elastic energy. Tape springs therefore have a natural tendency to unfurl in order to revert to their unwound state. If they are forced to refurl, they have a tendency to do so on a radius substantially equal to that of their transverse radius of curvature R. Only a small external force is therefore required in order to keep them wound in this shape. However, if this force suddenly disappears, the unfurling may be violent and uncontrolled, which means to say that the entire tape spring may have a tendency to straighten back out simultaneously over the entire length, and this presents a risk of damaging the flexible sheeting to which it is fixed, or surrounding elements. Conventional tape springs may thus present difficulties in terms of controlling their unfurling. Further, tape springs do not have the same stiffness on both the convex and concave faces 101, 102, their convex face 101 being flexible whereas their concave face 102 is rigid. The result of this is that in the unwound state, the slightest force, arrow in FIG. 1a, applied to the convex face 101 of the tape spring will have a tendency to cause the tape spring to flex whereas a force applied to the concave face 102 will have no effect, this presenting a problem of instability of the flexible structure in its unfurled state. In order to address this problem of stability in the unfurled state, it is therefore necessary to keep the sheeting in the unfurled position using an additional retaining device or to overengineer the tape spring in order to ensure that it remains stable under the forces of orbiting.

SUMMARY OF THE INVENTION

It is an object of the invention to produce a device for unfurling and refurling an unfurlable structure that does not have the disadvantages of the existing devices, but has the advantage of occupying very little space, that is simple to produce, that allows the volume of the unfurlable structure when stored under the fairing of a launcher to be optimized, that allows control over the unfurling and has the ability to be refurled and gives the structure rigidity and stability when unfurled without the need to use an additional retaining device.

To achieve that, the invention relates to a device for unfurling and refurling a flexible structure comprising at least one tape spring having an axis of unfurling and of refurling parallel to an axis X and a rotor capable of rotating about an axis Y perpendicular to the axis X, the tape spring being able, autonomously, to pass from a state in which it is wound around the rotor to an unwound state. The tape spring is mounted bent in two in the shape of a U with two branches and comprises a first end of a first branch fixed rigidly to a first anchor point and a second end of a second branch fixed rigidly to a second anchor point secured to the rotor, the first end of the first branch of the tape spring being mounted between two jaws of the first anchor point.

Advantageously, the second anchor point consists of two jaws of complementing shapes mounted facing one another, the second end of the second branch of the tape spring being mounted between the two jaws of the second anchor point.

Advantageously, the unfurling and refurling device may further comprise at least two rollers mounted facing one another on a fixed fitting supporting the axis of rotation of the rotor, the second branch of the tape spring secured to the rotor being set in between the two rollers.

Advantageously, the unfurling and refurling device may further comprise an unfurling-speed regulating device coupled to the rotor.

Advantageously, the unfurling and refurling device may further comprise at least one two-dimensional XY flexible membrane, the tape spring being fixed to the flexible membrane parallel to the axis X of unfurling and refurling of the tape spring.

Advantageously, the unfurling and refurling device may comprise at least two tape springs fixed parallel to one another and parallel to the axis X on the flexible membrane, each tape spring being mounted bent in two, the first end of each tape spring being fixed rigidly to the first anchor point and the second end of each tape spring being fixed rigidly to the second anchor point secured to the rotor.

Advantageously, the flexible membrane may comprise lateral battens orthogonal to the axis X, the lateral battens being respectively fixed to each tape spring.

According to a first embodiment of the invention, the unfurling and refurling device further comprises at least one fixed stator and the first anchor point is secured to the stator.

According to a second embodiment of the invention, the first anchor point is secured to the rotor and the unfurling and refurling device comprises two first rollers mounted facing one another on the fitting and two second rollers mounted facing one another on the fitting, the second branch of the tape spring being set in between the two first rollers, the first branch of the tape spring being set in between the two second rollers.

Advantageously, the unfurling and refurling device may comprise at least two tape springs mounted in opposition on one and the same rotor, each tape spring being mounted bent in two and comprising two ends which are fixed respectively to one and the same stator by first anchor points and to said rotor by second anchor points.

Alternatively, the unfurling and refurling device may comprise at least three tape springs mounted in a star on one and the same rotor, each tape spring being mounted bent in two and comprising two ends fixed respectively to one and the same stator by first anchor points and to said rotor by second anchor points.

According to one particular embodiment, the unfurling and refurling device may comprise at least two stators parallel to the axis Y, said two stators being mounted one on either side of the rotor and two flexible structures mounted in opposition on said rotor, each flexible structure comprising a two-dimensional XY flexible membrane and at least one tape spring fixed bent in two to the flexible membrane, the tape spring comprising a first end fixed rigidly to one of the two stators and a second end fixed to the rotor.

Advantageously the tape spring may be a corrugated sheet.

The invention also relates to a flexible unfurlable structure comprising at least one unfurling and refurling device.

Advantageously, the flexible unfurlable structure may further comprise an unfurlable articulated mast.

Advantageously, the articulated mast may be fixed to the platform of a satellite via a rotational-drive motor.

Advantageously, the flexible unfurlable structure may comprise two solar array half-wings mounted back to back on either side of a mid-plane of the unfurlable structure, the mid-plane being perpendicular to the axis X of unfurling and of refurling of the two half-wings and two independent unfurling and refurling devices respectively dedicated to the two half-wings, the two unfurling and refurling devices comprising two respective rotors, the two rotors having mutually parallel respective axes of rotation.

Advantageously, the flexible unfurlable structure may comprise a first flexible membrane fixed to the first branch of the bent-in-two tape spring and a second flexible membrane fixed to the second branch of said bent-in-two tape spring, the first flexible membrane supporting first objects and the second flexible membrane supporting second objects different from the first objects.

According to one particular embodiment, the first objects may be solar cells and the second objects may be lenses that concentrate the light, and the second flexible membrane is transparent to rays of light.

The invention also relates to a satellite comprising at least one device for unfurling and refurling a flexible structure.

BRIEF DESCRIPTION OF THE DRAWINGS

Other specifics and advantages of the invention will become clearly apparent in the remainder of the description which is given by way of purely illustrative and nonlimiting example with reference to the attached schematic drawings which depict:

FIGS. 2a, 2b, 2c: three perspective diagrams illustrating one example of an unfurling and refurling device, in the stored position, during the course of unfurling and in the unfurled position, respectively, according to a first embodiment of the invention;

FIGS. 3a to 3d: four diagrams in longitudinal section of the first example of an unfurling and refurling device corresponding to four different states of unfurling respectively, according to the invention;

FIGS. 3e and 3f: two diagrams, in cross section, illustrating two different examples of tape spring anchorage according to the invention;

FIGS. 6a and 6b: two diagrams, in longitudinal section, of one example of an unfurling and refurling device comprising two tape springs mounted in opposition, in the unfurled configuration, according to a second embodiment of the invention;

FIGS. 8b, 8c and 8d: three examples, in cross section, of a flexible membrane comprising lateral battens fixed to a tape spring, according to the invention;

FIGS. 9a and 9b: two perspective diagrams illustrating one example of a device for unfurling and refurling two unfurlable structures mounted in opposition, each unfurlable structure comprising three elementary tape springs fixed to a flexible sheeting, in the unfurled configuration, according to the invention;

FIGS. 10a to 10e: an example of the unfurling dynamics of the unfurlable structure of FIG. 8a, according to the invention;

FIGS. 11a to 11g: one example of the unfurling dynamics of the two unfurlable structures of FIG. 9a, according to the invention;

FIGS. 13a to 13d: examples of configurations of a flexible unfurlable structure comprising two pairs of two solar array half-wings mounted in opposition on the platform of a satellite, according to the invention;

FIG. 16: a view in longitudinal section, in the unfurled configuration, of a concentration-type solar array wing comprising two flexible membranes supporting different objects on the two external faces of the wing, according to the invention.

DETAILED DESCRIPTION

Figure 1A:
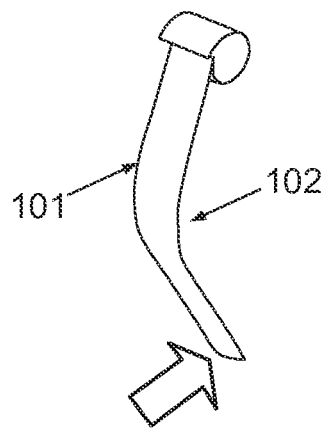
FIGS. 1a, 1b: two perspective diagrams of a first example of a tape spring having one single radius of curvature, in the process of bending and at rest, respectively.
Figure 1B:
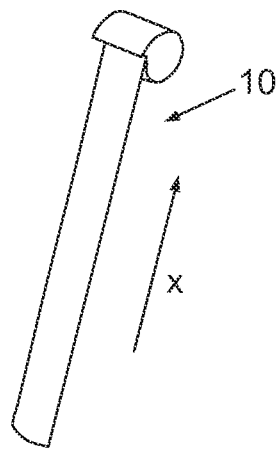
Figure 1C:
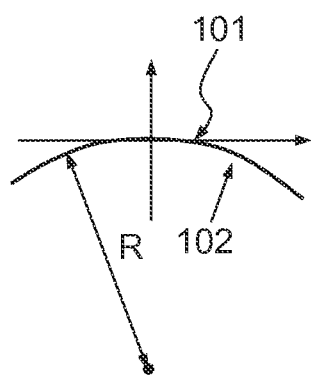
FIG. 1c: a diagram of the cross section of the first example of a tape spring.
Figure 1D:
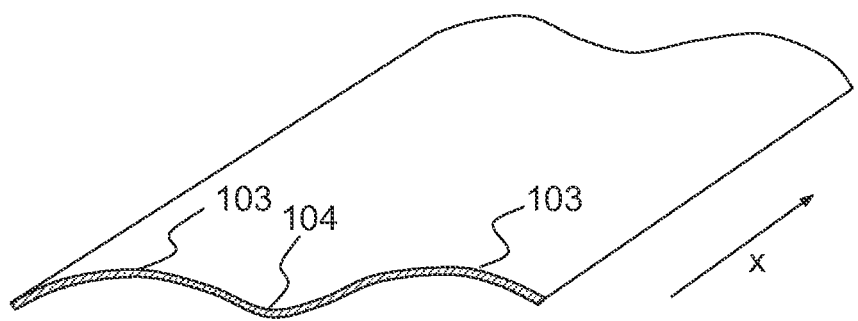
FIG. 1d: a perspective diagram of a second example of a tape spring with several radii of curvature.
Figure 5A:
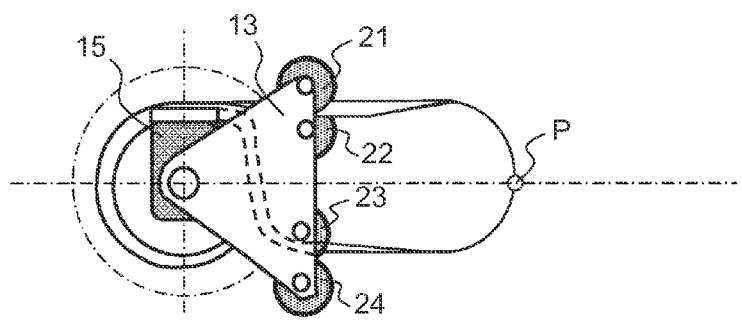
FIGS. 5a to 5c: three diagrams, in longitudinal section, illustrating one example of an unfurling and refurling device comprising two roller guide means according to the invention.
Figure 5B:
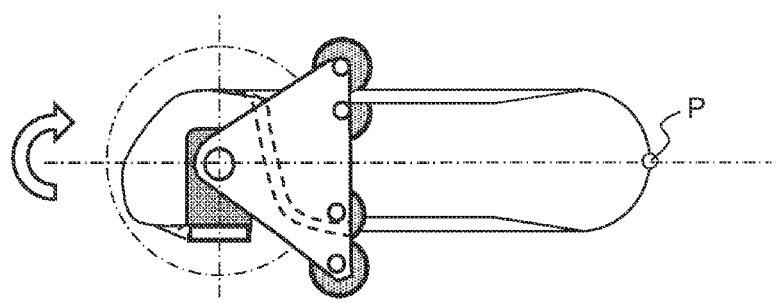
Figure 5C:
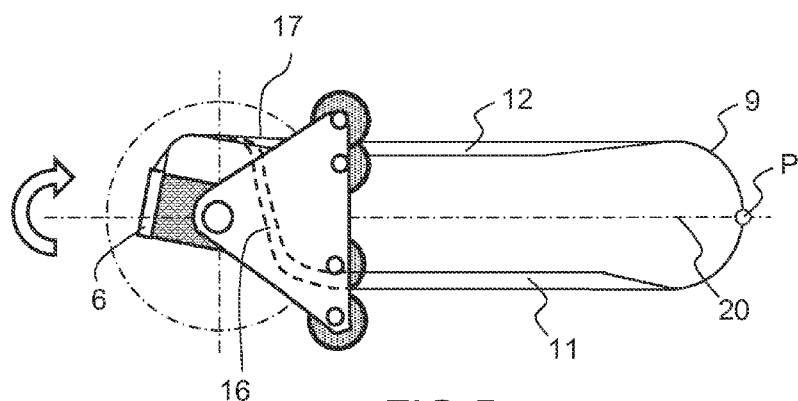

According to a first embodiment of the invention, the unfurling and refurling device depicted in FIGS. 2a to 2c and in the schematic views in section of FIGS. 3a to 3d, comprises at least one tape spring 10 having an axis of unfurling and of refurling parallel to an axis X and a rotor 15. As depicted in FIGS. 1a, 1b, 1c, the tape spring 10 may be a flexible blade which comprises a convex first face 101, a concave second face 102 and a cross section in the form of a circular arc having a transverse radius of curvature R. The tape spring may also be a corrugated flexible blade or a corrugated flexible sheet comprising several transverse radii of curvature, the corrugations of the blade or of the sheet being able to form several convex zones 103 separated by concave zones 104. FIG. 1d illustrates a perspective view of one example of a corrugated flexible blade comprising a face having two convex zones separated by a concave middle zone, although the number of convex zones may be greater than two. The tape spring is able to pass from the wound state to the unwound state autonomously, essentially using its own elastic stored energy. According to the invention, the tape spring is mounted bent in two and comprises two ends 16, 17 fixed rigidly to a first anchor point 5 and to a second anchor point 6 respectively, the second anchor point 6 being secured to the rotor 15. The first anchor point may be secured to a stator 14 or to the rotor 15. The tape spring therefore, during unfurling and in the unfurled position, forms a flexible U-shaped structure comprising two branches 11, 12 connected by a base 9 in the form of a circular arc the radius of which corresponds substantially to the radius of curvature of the tape spring. The end 16 situated at the end of the first branch 11 of the tape spring 10 may be fixed directly to a stator 14 or fixed via a fixed fitting 13 as depicted for example in FIGS. 3a to 3d, although this is not compulsory. Alternatively, in another embodiment of the invention, as depicted in FIGS. 5a to 5c, the end 16 situated at the end of the first branch 11 of the tape spring 10 may be fixed to the rotor 15. The fitting 13 secured to the stator 14 supports an axis of rotation Y of the rotor 15, the axis Y being perpendicular to the axis X. When the first anchor point 5 is fixed to the stator 14, in the stored position depicted in FIG. 3a, the tape spring 10 is wound around the rotor 15 from the end 17 of the second branch 12 to the end 16 of the first branch 11. In the stored position, the first branch 11 is therefore wound on top of the second branch 12. During unfurling depicted in FIG. 3b, the tape spring 10 is progressively unwound and unfurls, from the end 16 of the first branch 11 to the end 17 of the second branch 12, in a direction parallel to the axis X under the action of the rotation of the rotor 15, the end 16 of the first branch 11 remaining fixed, the end 17 of the second branch 12 remaining secured to the rotor. In the unfurled position, as depicted in FIG. 3d, the two branches 11, 12 of the tape spring 10 are spaced apart. At the base 9 of the U, the spacing between the two branches 11, 12 of the tape spring 10 corresponds substantially to the diameter of curvature D of the tape spring 10. The two branches 11, 12 of the tape spring 10 may be mutually parallel as depicted in FIGS. 3a, 3b, 3d, but this is not compulsory.

Because the tape spring is mounted bent in two, it has, in the unfurled position, a continuous flexible structure extending on either side of a longitudinal mid axis 20 parallel to the axis X of unfurling and of furling, the same, concave 102 or convex 101 or corrugated, face of the tape spring always facing towards the outside of the U shape. The two branches 11 and 12 of the unfurled flexible structure therefore have front and rear external faces with identical stiffnesses in two opposite senses of one and the same direction Z orthogonal to the plane of the unfurled flexible structure which is therefore perfectly stable. For preference in instances in which the tape spring is a flexible blade comprising two faces, one convex and one concave, the tape spring is bent in two on its concave face 102 side, so that its convex face 101 faces towards the outside of the U shape. However, the tape spring can also be bent in two on its convex face 101 side so that its concave face 102 faces towards the outside of the U shape.

In the stored position, the tape spring 10 is kept wound on itself. The unfurling of the tape spring occurs autonomously, using the stored elastic energy of the tape spring. In order for the unfurling of the tape spring during the unfurling phase to be progressive, consistent and even, the unfurling and refurling device may further comprise a regulating device 45 coupled to the rotor 15, as depicted for example in FIG. 9b. The regulating device 45 allows the tape spring to be kept wound in the stored position and regulates the speed at which the tape spring 10 unfurls during deployment. The regulating device may for example comprise an electric motor associated with reduction gearing and may further comprise a stop device that fixes the tape spring in the stored position. For preference, the regulating device 45 cannot rotate the other way when unpowered, and this makes it possible to keep the tape spring wound up in the stored position. Application of power to the regulating device 45 then allows the tape spring to be released, which spring then unfurls autonomously, the speed at which it unfurls being controlled by the regulating device 45.

Various types of anchorage may be formed on the rotor 15 and on the stator 14. The anchor points depicted in FIGS. 3e and 3f comprise two complementing components referred to as jaws 18, 19, having two internal surfaces of complementing shapes positioned facing one another, the two complementing internal surfaces of the two jaws 18, 19 constituting surfaces for anchoring the tape spring 10. The tape spring 10 is therefore set and trapped in between the two jaws, at the end 16 of the first branch 11 of the U and of the end 17 of the second branch of the U. In FIG. 3e, the two tape spring anchoring surfaces are of planar shape making it easier to wind and unwind the tape spring 10 but with the tape spring not being as well set in when in the unfurled position. In FIG. 3f, the two tape spring anchoring surfaces are of concave and convex respective shapes so that the tape spring can be firmly set in when in the unfurled position, but requiring a greater radius of winding and unwinding of the tape spring 10 than is required when the anchoring surfaces are planar. The choice of the type of anchorage depends on the tape spring rigidity and drive torque performance desired.

Figure 4A:
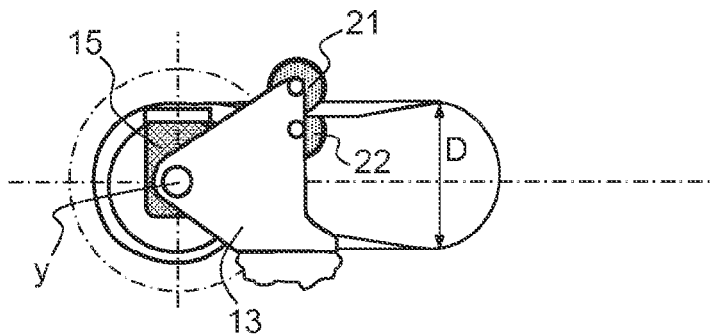
FIGS. 4a to 4c: three diagrams, in longitudinal section, illustrating one example of an unfurling and refurling device comprising a roller guide means, according to the invention.
Figure 4B:
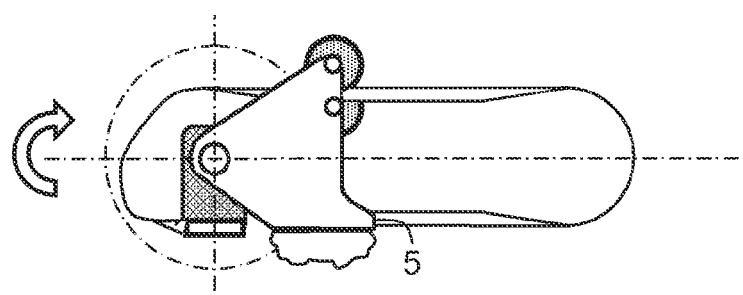
Figure 4C:
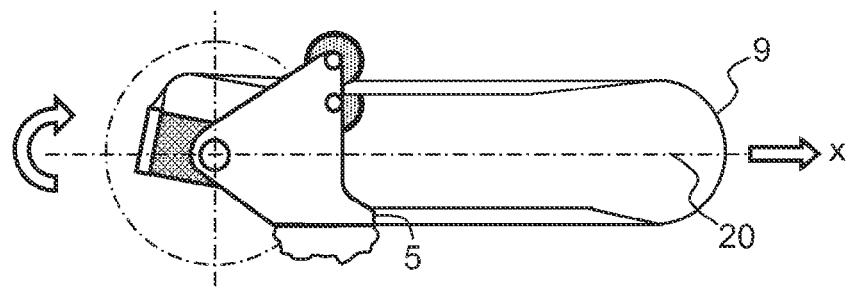
Figure 4D:
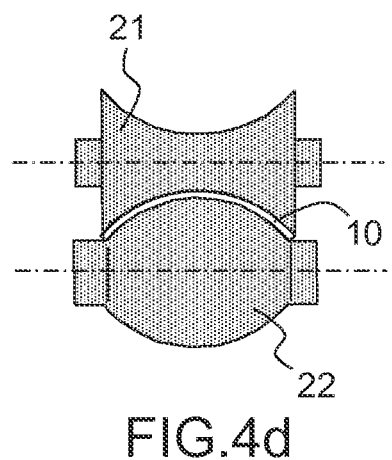
FIGS. 4d to 4f: three diagrams, in cross section, illustrating three examples of roller guide means according to the invention.

The first jaw 19, which for example is convex, is secured to the stator 14 when this jaw is situated in the region of the first anchor point 5, or is secured to the rotor 15 when situated in the region of the second anchor point 6. The second jaw 18, which for example is concave, is fixed to the first jaw 19 by clamps 4. The clamps are fixed to an external surface of the second jaw 18, it being possible for the external surface to be planar as depicted in FIGS. 3e and 3f or to have some other shape, for example concave, as depicted in FIG. 4d in which the roller 21 has a concave external surface.

The end 16 of the first branch 11 fixed to the stator 15 is generally equipped with a first anchor point 5 comprising two complementing jaws 18, 19, a concave one and convex one respectively, like the anchor point depicted in FIG. 3f, because it is necessary to have an anchor point that is as firm as possible at this end 16 and there is no constraint on winding at this end 16.

Advantageously, the unfurling and refurling device may comprise means of guiding the tape spring 10 to guide the orientation of the tape spring 10 during unfurling or refurling. In FIGS. 4a to 4c a means of guiding the second branch 12 of the tape spring is fixed to the fitting 13. As depicted in FIGS. 4a to 4d, the guide means may for example comprise two rollers 21, 22, the two rollers 21, 22 having two complementing surfaces, these respectively being concave and convex, placed facing one another. To reduce friction between the rollers and the tape spring, each roller 21, 22 may be of one-piece structure as depicted in FIG. 4d or may consist of several different parts 21a, 21b, 21c, 22a, 22b, 22c exhibiting symmetry of revolution, these for example being cylindrical or convex or concave, about one and the same axis as depicted in FIG. 4f. The tape spring is then set and trapped in between the two rollers 21, 22 at the second branch 12 of the U. The two rollers also allow the tape spring 10 to wind up correctly on the rotor 15 during a refurling phase and allow the tape spring to be refurled in flight when the unfurlable structure is mounted on a satellite. In the special case depicted in FIGS. 4a to 4c, in which the tape spring 10 is guided by a system of rollers, it is possible to have planar anchor points at the rotor 15 as depicted in FIGS. 3e and 3f.

Figure 4E:
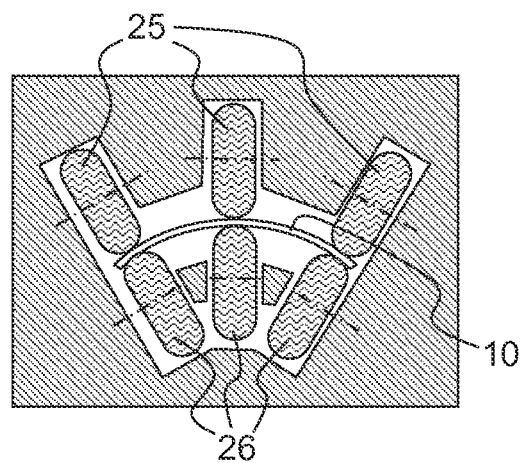
Figure 4F:
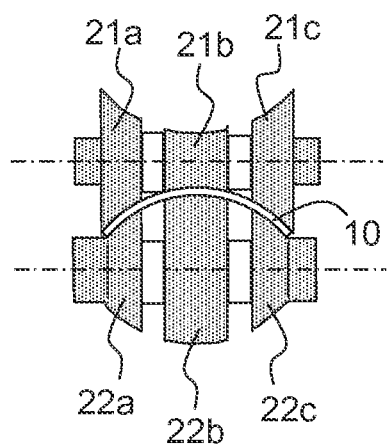

In order to reduce friction between the rollers and the tape spring during unfurling and refurling phases, it is possible to replace the convex roller 22 and the concave roller 21 with two sets 25, 26 of several rollers arranged opposite one another, in the form of circular arcs, respectively thereby forming a convex shape and a concave shape which complement one another, the two sets of rollers being able to comprise the same number of rollers, for example three rollers as depicted in FIG. 4e, or a different number of rollers. The first set 25 of rollers comprises several radially-spaced rollers arranged in a first circular arc, the second set 26 of rollers comprises several radially spaced rollers arranged in a second circular arc, the first and second circular arcs being concentric, the rollers of the second set 26 of rollers being positioned respectively facing the rollers of the first set 25 of rollers. The tape spring 10 is then set and gripped in between the first and second sets 25, 26 of rollers.

In an alternative form of the invention which has been depicted in FIGS. 5a to 5c, the end 16 of the first branch 11 and the end 17 of the second branch 12 of the tape spring 10 are fixed to the anchor point 6 secured to the rotor 15 and the guide means comprise two first rollers 21, 22 and two second rollers 23, 24 mounted on the fitting 13. The two first rollers 21, 22 and the two second rollers 23, 24 are placed symmetrically on the fitting 13 with respect to the mid axis 20 of the U and comprise two complementing surfaces, concave and convex respectively, mounted facing one another. The tape spring 10 is then set and gripped in between the two first rollers 21, 22 at the second branch 12 of the U and between the two second rollers 23, 24 at the first branch 11 of the U. In this case, in the stored position, the two branches 11, 12 of the tape spring 10 are wound together around the rotor 15 and during unfurling, the two branches 11, 12 of the tape spring 10 are unfurled simultaneously. The two branches of the tape spring unwind and wind simultaneously around the rotor 15, guided respectively by the two first rollers 21, 22 and by the two second rollers 23, 24, the base of the U and the point of intersection P between the base of the U and the mid axis of the U therefore always remaining positioned at the same point along the tape spring 10.

The unfurling and refurling device may have a single tape spring bent in two or several tape springs, each tape spring being bent in two and having a second end fixed to the one and the same rotor 15 and a first end fixed either to one and the same stator or to one and the same rotor. In a second embodiment of the invention, as depicted for example in FIGS. 6a and 6b, the unfurling and refurling device comprises two tape springs 10a, 10b having axes of unfurling and of refurling of opposite sense, which may for example be parallel to the axis X or make an angle A with respect to the axis X. The two tape springs 10a, 10b may be fixed to one and the same fitting 13 secured to the stator 14 and to the same rotor 15, each tape spring being mounted bent in two so as to form, during unfurling and in the unfurled position, a U-shaped structure. Thus, the first tape spring 10a comprises a first end 16a fixed to the stator 14 via the fitting 13 by a first fixed anchor point 5a and a second end 17a fixed to the rotor 15 by a second anchor point 6a. The second tape spring 10b comprises a first end 16b fixed to the stator by a fixed first anchor point 5b and a second end 17b fixed to the rotor 15 by a second anchor point 6b secured to the rotor 15. In the stored position, the two tape springs 10a, 10b are wound together around the rotor 15 and, during unfurling, the two tape springs 10a, 10b are unfurled simultaneously in opposition to one another on either side of the rotor 15 in two directions which may for example be parallel to the axis X and make an angle of 180° with one another as depicted in FIG. 6a, or in two directions making between them an angle A of less than 180°, as depicted in FIG. 6b.

Figure 7:
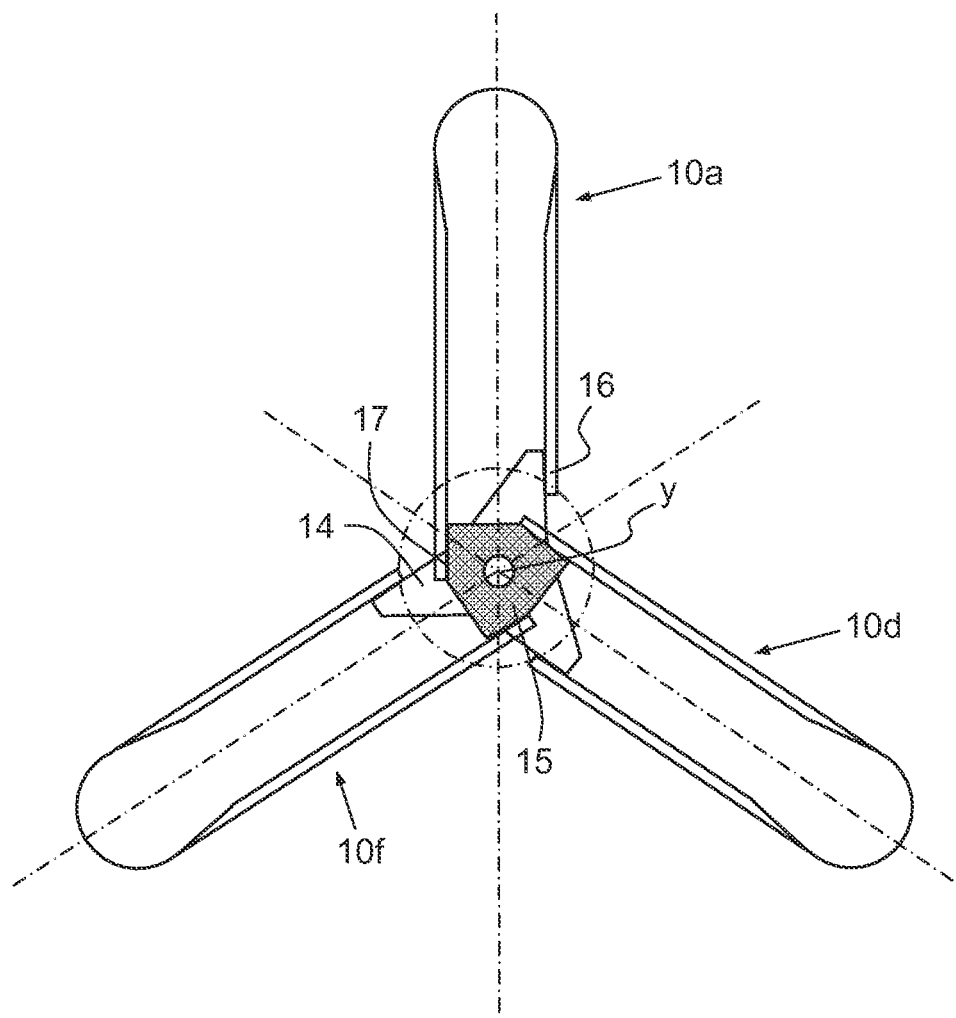
FIG. 7: a diagram, in longitudinal section, of one example of an unfurling and refurling device comprising three tape springs mounted in a star, in the unfurled configuration, according to a third embodiment of the invention.

In a third embodiment of the invention, the unfurling and refurling device comprises several tape springs having axes of unfurling and of refurling arranged in a star. For example, in FIG. 7, three tape springs 10c, 10d, 10f are arranged in a star and between them make angles of the order of 120°. The three tape springs 10c, 10d, 10f have a first end 16 fixed for example to one and the same stator 14 or alternatively to one and the same rotor 15 and a second end 17 fixed rigidly to one and the same rotor 15, each tape spring being mounted bent in two so that it forms a U shape during unfurling and in the unfurled position. In this case, the stator 14 may for example have the shape of a three-branch star to which three branches the first ends 16 of the three tape springs are respectively fixed and the rotor 15 may for example have a polygonal shape comprising at least three faces to which the second ends 17 of the three tape springs are respectively fixed. It is also possible to produce an unfurling and refurling device that comprises more than three tape springs arranged in a star.

When the objects that are to be unfurled are small in size, such as electronic circuits, electromagnetic elements, antennas or small planar surfaces for example, the tape spring 10 can be used to support the objects that are to be unfurled, the objects being fixed directly to the tape spring. Unfurling of the tape spring therefore unfurls the objects fixed to it. When larger sized planar surfaces equipped, for example, with elements such as solar cells need to be unfurled, it may be necessary to fix a flexible membrane 30, intended to support the elements that are to be unfurled, to at least two tape springs in order to increase the rigidity of the flexible structure as a whole when it is unfurled.

Figure 8A:
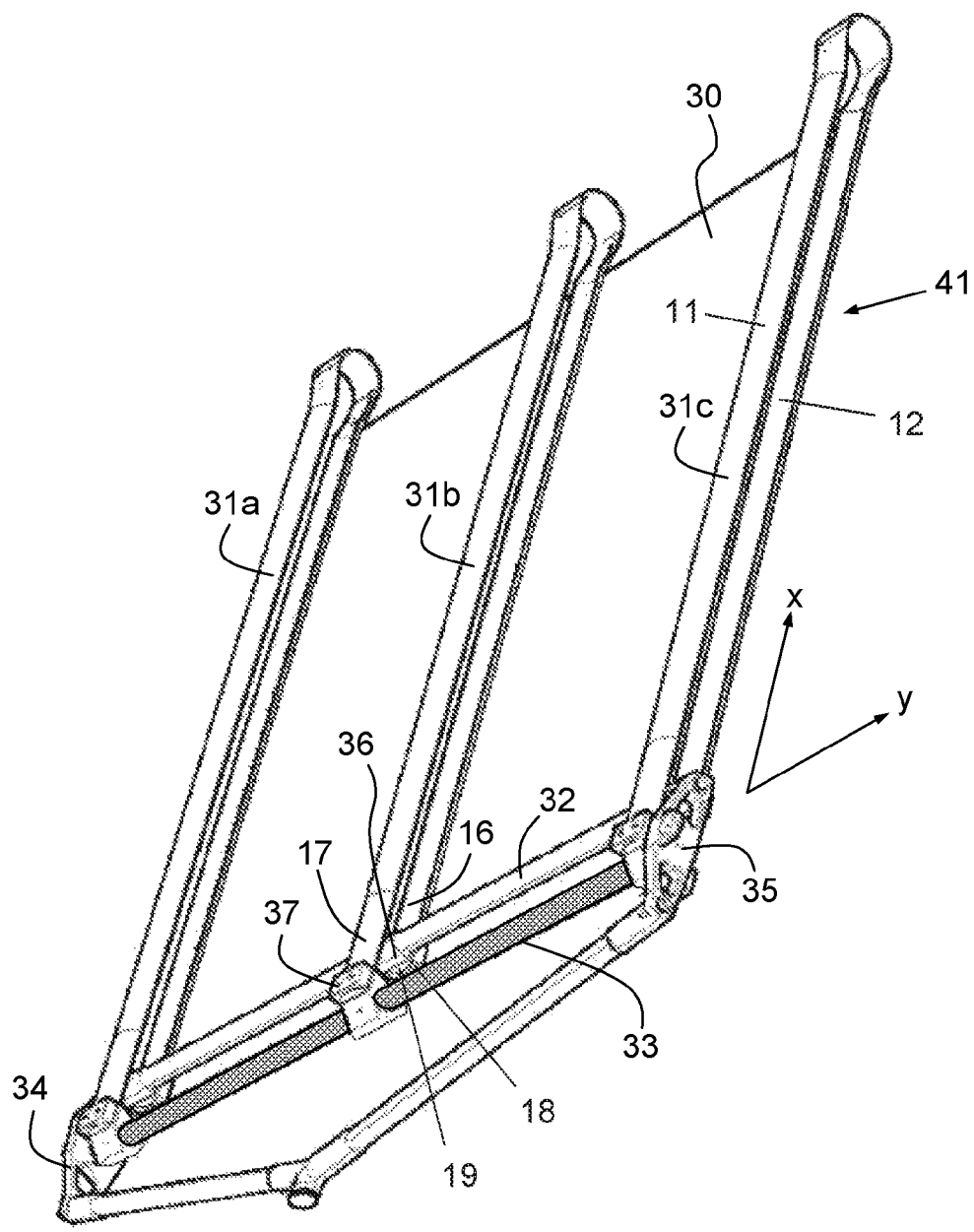
FIG. 8a: a perspective diagram of a device for unfurling and refurling an unfurlable structure comprising three elementary tape springs fixed to a flexible sheeting, in the unfurled configuration, according to the invention.

A diagram of one example of a device for unfurling and refurling a flexible unfurlable structure 41 comprising three elementary tape springs fixed to a flexible membrane is depicted in FIG. 8a. The unfurling and refurling device comprises a flexible membrane or a flexible sheeting, 30, which is in two dimensions respectively parallel to the axes X and Y, three tape springs 31a, 31b, 31c, a stator 32, a rotor 33 and two fittings 34, 35. The flexible membrane 30 is intended to support elements that are to be unfurled, such as solar cells, metalized cells for reflecting radio waves, or insulating elements for creating a heat screen for example, or any other device. Each tape spring 31a, 31b, 31c is mounted bent in two, the three tape springs being fixed to the flexible membrane 30 parallel to one another and parallel to the longitudinal unfurling and refurling axis X. For example, two tape springs may be mounted on the lateral edges of the flexible membrane and the third tape spring may be mounted along a mid-plane of the flexible membrane. The flexible membrane 30 may be reinforced with lateral battens 80, 84, 85 orthogonal to the axis X and fixed respectively to each tape spring 31a, 31b, 31c. FIGS. 8b and 8c depict two examples, in cross section, of lateral battens fixed to a tape spring comprising several transverse radii of curvature. The lateral battens 80, 84, 85 may be fixed at a fixing point 81, 82, 83 situated for example on the crest of a corrugation 103, 104 of the tape spring. When the tape spring has several corrugations, the fixing point 81, 82, 83 may be situated at the crest of the middle corrugation 104 as depicted in FIG. 8b, or at the crest of a lateral corrugation 103 as depicted in FIG. 8c. In the case of FIG. 8c, the two lateral corrugations 103 of the tape spring provide two possible fixing points 82, 83 and the possibility of fixing the two different lateral battens 84, 85 to the same tape spring. Although a tape spring comprising several transverse radii of curvature is advantageous as far as the fixing of the lateral battens is concerned, it is of course equally possible to fix the lateral battens to a tape spring having a single transverse radius of curvature as depicted for example in FIG. 8d in which a lateral batten is fixed to the crest of the convex face 101 of two tape springs having a single transverse radius of curvature arranged parallel to one another. In the unfurled position, because each tape spring is bent into a U shape, depending on the desired application, it is possible to fix the tape spring to one and the same flexible membrane along the entire length of the tape spring, each branch of the U being fixed to the flexible membrane before the tape spring is bent over, or it is possible to fix the two branches of the U to two different flexible membranes or, in the case of an application to a solar array for example, to fix just one branch of the tape spring to the flexible membrane.

For preference, each tape spring is fixed to the flexible membrane via its convex face or to the crest of a corrugation when each tape spring has several corrugations. The tape spring may be fixed to the flexible membrane using any fixing means such as, for example, bonding, stitching, riveting or stapling. The rotor 33 has an axis of rotation Y perpendicular to the axis X and comprises two opposite ends respectively mounted on the two fittings 34, 35. As depicted in the embodiment of FIG. 8a, the rotor 33 and the stator 32 may for example be of cylindrical shape and the stator 32 may have a longitudinal axis parallel to the longitudinal axis Y of the rotor 33 and have two opposite ends respectively fixed to the two fittings 34, 35 via fixed anchor points. Each tape spring has two ends 16, 17 fixed rigidly to the stator 32 and to the rotor 33 respectively via anchor points 36, 37. In the example of FIG. 8a, the rotor 33 and the stator 32 are offset from one another in a direction parallel to the axis X of unfurling by a distance slightly greater than the diameter of curvature of each tape spring so as to allow the tape springs to unwind and wind up around the rotor 33 during unfurling and refurling.

Figure 9B:
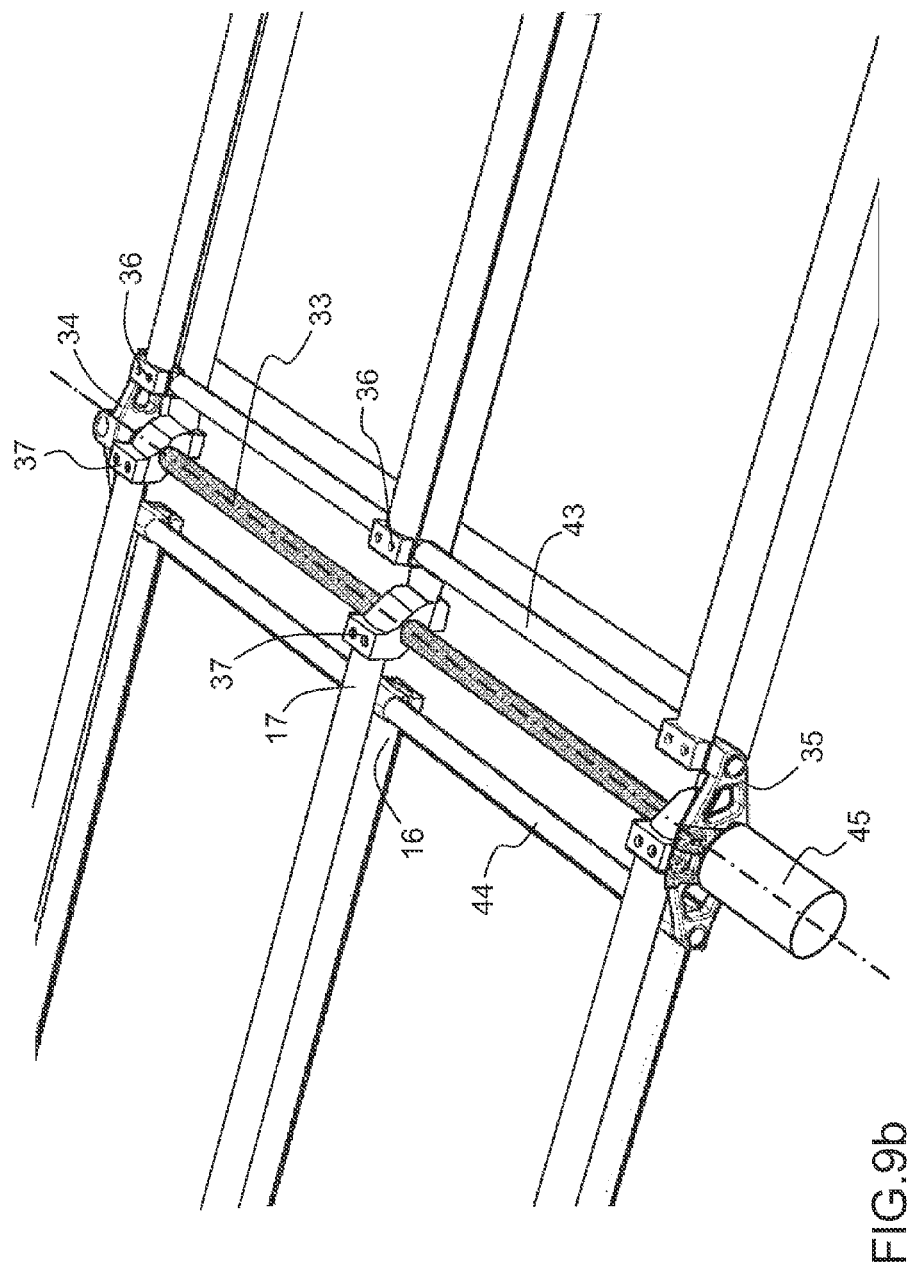

The unfurling and refurling device may comprise a single unfurlable structure 41 as described in conjunction with FIG. 8a but it is equally possible to mount two unfurlable structures in opposition on one and the same rotor and to unfurl or refurl the two structures simultaneously. In FIGS. 9a and 9b, the unfurling and refurling device comprises two unfurlable structures 41, 42 each comprising three elementary tape springs fixed to a flexible membrane as described in conjunction with FIG. 8a, a single rotor 33 common to the two unfurlable structures and two identical stators 43, 44 mounted one on each side of the rotor 33. The unfurlable structure depicted in FIG. 9b also shows an unfurling-speed regulating device 45 mounted at one end of the rotor 33. In the stored position, the two unfurlable structures are wound together around the rotor 33 and the regulating device 45 is unpowered, which allows the two unfurlable structures to be kept wound together around the rotor 33. In FIGS. 9a and 9b the axes of unfurling of the two unfurlable structures make an angle of 180° with one another, but it is of course possible to position the axes of unfurling of the two unfurlable structures in two directions that make between them an angle A of less than 180°, as described in conjunction with FIG. 6b.

FIGS. 10a to 10e illustrate one example of the unfurling dynamics of a flexible structure according to the embodiments of FIGS. 3a to 3d and 8a, such as a solar array for example. In this example, the flexible structure comprises a membrane or a flexible sheeting 30 in two dimensions parallel to the axes X, Y and three tape springs 31a, 31b, 31c fixed to the flexible membrane 30. As depicted in the embodiment, although this is nonessential, in order to keep the flexible structure away from a support 50, such as the platform of a satellite for example, the flexible structure may be mounted at the end of a mast 53 via a first articulation 54, the base of the mast being mounted on the support via a second articulation 55. To increase the length of the mast, the mast may be made up of several arms 57 mounted end to end and articulated to one another by intermediate articulations 56. To orient the flexible structure, a motor 58 that drives the rotation of the mast about the axis X of unfurling of the flexible structure may be positioned at the foot of the mast 53, under the second articulation 55. In the stored position depicted in FIG. 10a, the mast 53 is folded onto the support 50 and the flexible structure is wound around the rotor, the two fittings 34, 35 being fixed to the support 50 by fixings 51, 52. From the stored position as depicted in FIGS. 10b and 10c, the mast is unfurled autonomously, by releasing the fixings 51, 52. When the mast is unfurled, as depicted in FIGS. 10d and 10e, application of power to the regulating device 45 allows the flexible membrane wound on the rotor 33 to unfurl, this occurring autonomously, the speed at which the membrane unwinds around the axis Y being controlled by the regulating device 45 fixed to the rotor.

It is also conceivable to unfurl the flexible structure before unfurling the mast 53 while this mast is still fixed to the support 50 by the fixings 51 and 52.

FIGS. 11a to 11g illustrate one example of the unfurling dynamics of two unfurlable structures 41, 42 mounted in opposition on the same rotor 33, such as two solar arrays for example, according to the embodiments of FIGS. 6, 9a, 9b. In this example, each unfurlable structure comprises a flexible membrane 30 in two dimensions parallel to the axes X, Y and three tape springs 31a, 31b, 31c fixed to the flexible membrane. As depicted in the embodiment, although this is nonessential, in order to keep the two flexible structures away from the support 50, such as the body of a satellite for example, the two flexible structures are mounted at the end of a mast 53 via a first articulation 54, the base of the mast being mounted on the support via a second articulation 55. In the stored position depicted in FIG. 11a, the mast is folded down on the support 50 and the two flexible structures are wound together around the rotor 33, the two fittings 34, 35 being fixed to the support 50 by fixings 51, 52. From the stored position, as depicted in FIGS. 11b and 11c, the mast is unfurled autonomously, by releasing the fixings 51, 52. When the mast is deployed, as depicted in FIGS. 11d to 11g, the two flexible structures are unfurled simultaneously on each side of the rotor 33, autonomously. Application of power to the regulating device 45 allows the flexible membrane wound on the rotor 33 to unfurl, the speed at which the membrane unwinds around the axis Y being controlled by the regulating device 45 fixed to the rotor.

Figure 12A:
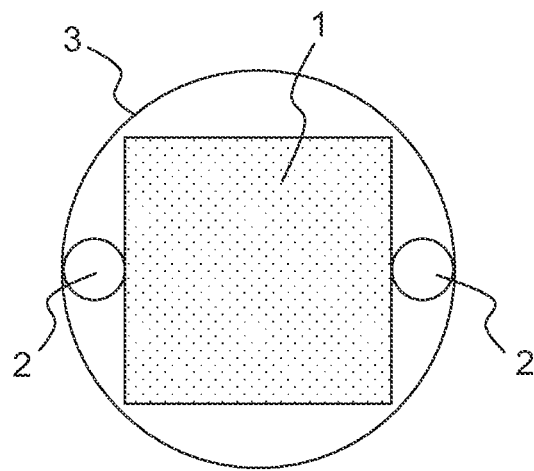
FIGS. 12a to 12c: examples of various configurations of flexible unfurlable structures, such as solar array wings, mounted on the platform of a satellite, according to the invention.
Figure 12B:
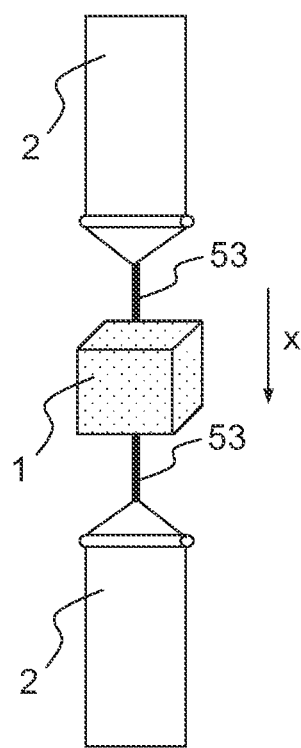
Figure 12C:
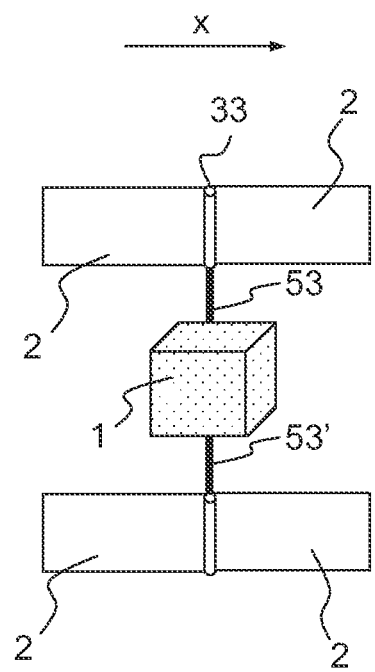

FIGS. 12a to 12c illustrate examples of various configurations of flexible unfurlable structures, such as solar array wings, mounted on the platform of a satellite 1, according to the invention. In FIG. 12a, the assembly consisting of the satellite 1 and the wings 2 of solar arrays is mounted in the fairing 3 of a launcher, the wings 2 of solar arrays being in the stored position. FIG. 12b shows a configuration in which two wings 2 of solar arrays are deployed symmetrically on either side of the satellite 1 by means of a mast 53, the axis of unfurling X of the solar array wings being parallel to the mast. FIG. 12c illustrates pairs of two solar array wings 2 fixed to two unfurlable structures mounted in opposition on one and the same rotor 33, the two pairs being unfurled symmetrically on either side of the satellite 1 via a respective mast 53, 53'.

FIGS. 13a and 13b illustrate examples of the configuration of a flexible unfurlable structure comprising two pairs of two solar array half-wings 2a, 2b, 2c, 2d mounted on either side of the satellite 1, via a respective mast 53, 53', the axis of unfurling X of the solar array half-wings being perpendicular to the mast. The half-wings 2a, 2b, 2c, 2d of each pair are mounted back to back on two different respective rotors 33a, 33b, 33c, 33d. Each half-wing is therefore an independent flexible unfurlable structure having its own dedicated unfurling and refurling device depicted in the various FIGS. 3a to 3d, 4a to 4f, 5a to 5c or in FIG. 8a. In FIG. 13a, the assembly consisting of the satellite 1 and the two solar array half-wings 2a, 2b, 2c, 2d is mounted in the fairing 3 of a launcher, the two half-wings being in the stored position. In FIG. 13b, the pairs of two solar array half-wings 2a, 2b, 2c, 2d are in the unfurled position. The two half-wings of one and the same pair unfurl parallel to the axis X but in two opposite senses of the one direction.

FIGS. 13c and 13d illustrate two views in longitudinal section along the axis X of unfurling, of one example of the unfurling and refurling of an unfurlable structure comprising two solar array half-wings 2a, 2b mounted back to back on either side of a mid-plane 60 of the unfurlable structure, the mid-plane 60 being perpendicular to the axis X of unfurling and refurling. FIG. 13c shows the two half-wings 2a, 2b in the stored position. In FIG. 13d, one of the two half-wings 2b is in the process of unfurling, the other half-wing 2a remains in the stored position. The two half-wings 2a, 2b each comprise at least one tape spring mounted bent in two as described in conjunction with FIG. 6, but the two respective tape springs 61a, 61b of the two half-wings are respectively wound around two different rotors 62a, 62b arranged symmetrically on either side of the mid-plane 60. The two rotors 62a, 62b have respective axes of rotation 63a, 63b which are mutually parallel and supported by one and the same fitting 64 connected to a fixed stator 65. Because each half-wing is mounted on its own dedicated rotor, each half-wing has its own dedicated unfurling and refurling device. The unfurling of each half-wing of one and the same pair can be controlled by two different regulating devices associated with each rotor, and the unfurling of each half-wing is then independent of the unfurling of the other half-wings, allowing the satellite to be steered by solar winds.

The unfurlable structure may be unfurled fully or partially. In the case of the embodiments of FIGS. 13a to 13d in which the flexible unfurlable structure comprises two pairs of two solar array half-wings 2a, 2b, 2c, 2d mounted on either side of the satellite 1, the unfurling of the half-wings can be controlled independently of the unfurling of the other half-wings and it is possible to modify the geometry of the wings of the solar arrays by partially or fully refurling one or more half-wing in flight. That then allows for steering or allows deviations in the path of the satellite to be compensated for using the force of the solar wings on the modified-geometry wings.

Figure 14A:
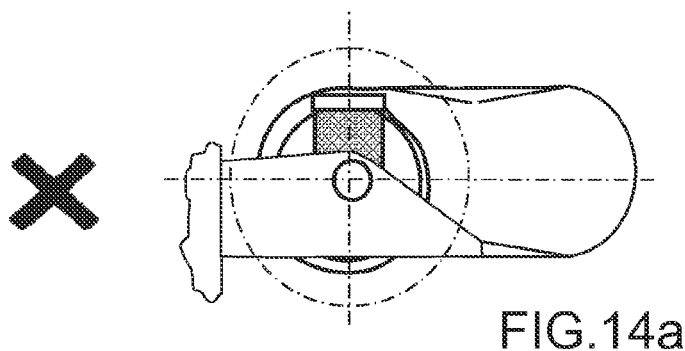
FIGS. 14a to 14c: three views, in longitudinal section, of a solar array wing in the stored position, the partially unfurled position and the fully unfurled position, respectively, according to the invention.
Figure 14B:
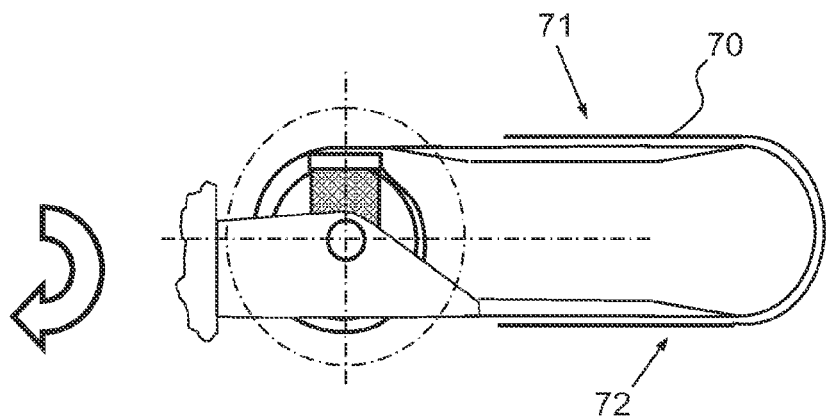

In the case of a solar array wing, in the unfurled position the solar cells are all located on one and the same single face of the wing whereas during the process of unfurling it is possible to obtain solar cells located on the two faces of the wing as depicted for example in FIG. 14b. In FIG. 14a, the solar array wing is in the stored position. In FIG. 14b, the solar array wing is in a partially unfurled position and the solar cells 70 are distributed over the respectively front and rear two external faces 71, 72 of the solar array wing. In this configuration, the two external faces 71, 72 of the solar array wing are active. Partial unfurling of a solar array wing is particularly advantageous during a phase of transferring the satellite from an area in space in which the satellite is ejected from the fairing of a launcher to a definitive orbit around the earth because during this transfer phase, the orientation of the wing of the solar array with respect to the sun is not optimized and can change. Moreover, partial unfurling of the unfurlable structure may be performed before the mast is unfurled, thus allowing the satellite to absorb greater mechanical loadings than it can when the mast is unfurled.

Figure 14C:
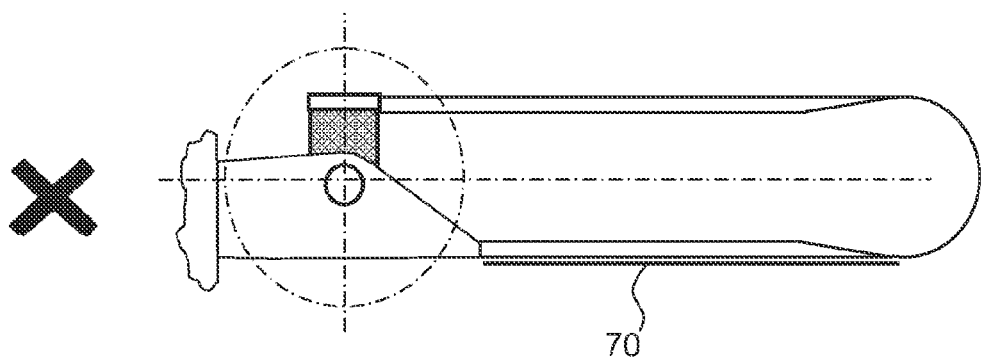
Figure 15A:
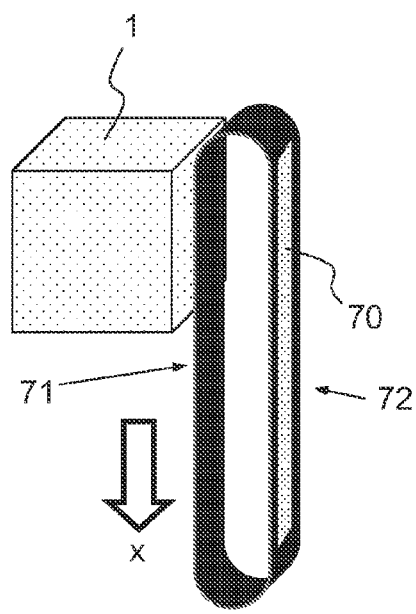
FIGS. 15a and 15b: two perspective views of a solar array wing and of two solar array wings mounted in opposition on a satellite, respectively, in the fully unfurled position, according to the invention.
Figure 15B:
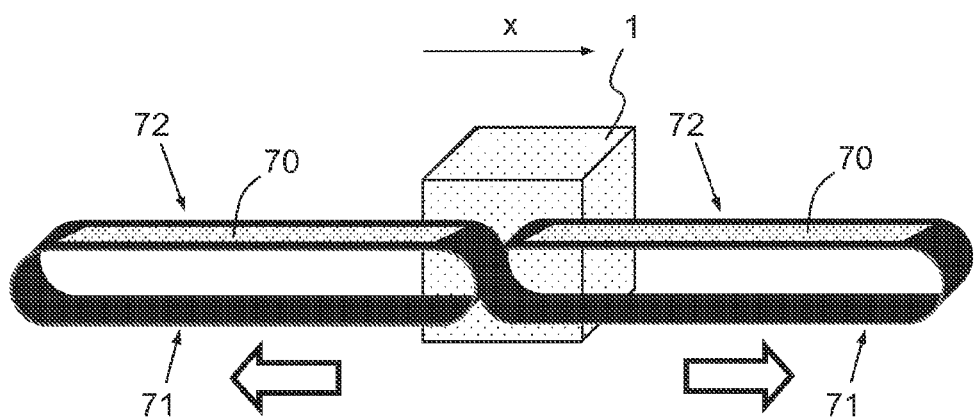

In FIGS. 14c and 15a the solar array wing is fully unfurled and the solar cells 70 are all located on the front external face 72 of the solar array. In FIG. 15b, an unfurlable structure comprising two solar array wings is mounted on a satellite 1. The two solar array wings are fully unfurled and the solar cells 70 are all located on the front external faces 72 of each wing of the solar array.

In another type of application, as depicted for example in FIG. 16, it is equally possible to fix different objects to the two rear 71 and front 72 external faces of one and the same wing. In such an instance, a first flexible membrane equipped with first objects is fixed to the first branch of the tape spring bent into a U and a second flexible membrane equipped with second objects different from the first objects is fixed to the second branch of the tape spring. For example, in the case of a concentration-type solar array, the first flexible membrane may be equipped with solar cells 70 and the second flexible membrane may be transparent and equipped with optical elements 73 able to focus the light, such as concentration lenses for example, the optical elements able to focus the light being arranged facing the solar cells. The concentration lenses 73 situated on a face of the wing towards the sun therefore allow the rays of the sun 74 to be concentrated onto the solar cells 70.

Although the invention has been described in conjunction with some particular embodiments, it is quite obvious that it is not in any way restricted thereto and that it comprises all technical equivalents of the means described and combinations thereof where these fall within the scope of the invention.

The invention claimed is:

1. A device for unfurling and refurling a flexible structure comprising at least one tape spring having an axis of unfurling and of refurling parallel to an axis X, a rotor capable of rotating about an axis Y perpendicular to the axis X, and a stator supporting the rotation axis Y of the rotor, the tape spring being able, autonomously, to pass from a state in which the tape spring is wound around the rotor to an unwound state, the tape spring being mounted bent in a transverse direction into a shape of a U with two branches, wherein the tape spring comprises a first end of a first branch fixed rigidly to a first anchor point and a second end of a second branch fixed rigidly to a second anchor point secured to the rotor, the first end of the first branch of the tape spring being mounted between two jaws of the first anchor point, wherein the first and second anchor points are different from one another, and wherein the two ends of the two branches are the respective two opposite ends of the tape spring in the longitudinal direction X.

2. The unfurling and refurling device of claim 1, wherein the second anchor point consists of two jaws of complementing shapes mounted facing one another, the second end of the second branch of the tape spring being mounted between the two jaws of the second anchor point.

3. The unfurling and refurling device of claim 1, further comprising at least two rollers mounted facing one another on a fixed fitting supporting the axis of rotation of the rotor, the second branch of the tape spring secured to the rotor being set in between the two rollers.

4. The unfurling and refurling device of claim 1, further comprising an unfurling-speed regulating device coupled to the rotor.

5. The unfurling and refurling device of claim 1, further comprising at least one two-dimensional XY flexible membrane, the tape spring being fixed to the flexible membrane parallel to the axis X of unfurling and refurling of the tape spring.

6. The unfurling and refurling device of claim 5, comprising at least two tape springs fixed parallel to one another and parallel to the axis X on the flexible membrane, each tape spring being mounted bent in two, the first end of each tape spring being fixed rigidly to the first anchor point and the second end of each tape spring being fixed rigidly to the second anchor point secured to the rotor.

7. The unfurling and refurling device of claim 6, wherein the flexible membrane comprises lateral battens orthogonal to the axis X, the lateral battens being respectively fixed to each tape spring.

8. The unfurling and refurling device according to claim 1, further comprising at least one fixed stator and wherein the first anchor point is secured to the stator.

9. The unfurling and refurling device according to claim 1, wherein the first anchor point is secured to the rotor and wherein the unfurling and refurling device comprises two first rollers mounted facing one another on a fixed fitting supporting the axis of rotation of the rotor and two second rollers mounted facing one another on the fitting, the second branch of the tape spring being set in between the two first rollers, the first branch of the tape spring being set in between the two second rollers.

10. The unfurling and refurling device of claim 8, comprising at least two tape springs mounted in opposition on one and the same rotor, each tape spring being mounted bent in two and comprising two ends which are fixed respectively to one and the same stator by first anchor points and to said rotor by second anchor points.

11. The unfurling and refurling device of claim 8, comprising at least three tape springs mounted in a star on one and the same rotor, each tape spring being mounted bent in two and comprising two ends fixed respectively to one and the same stator by first anchor points and to said rotor by second anchor points.

12. The unfurling and refurling device of claim 8, comprising at least two stators parallel to the axis Y, said two stators being mounted one on either side of the rotor and two flexible structures mounted in opposition on said rotor, each flexible structure comprising a two-dimensional XY flexible membrane and at least one tape spring fixed bent in two to the flexible membrane, the tape spring comprising a first end fixed rigidly to one of the two stators and a second end fixed to the rotor.

13. The unfurling and refurling device according to claim 1, wherein the tape spring is a corrugated sheet.

14. A flexible unfurlable structure comprising at least one unfurling and refurling device according to claim 1.

15. The flexible unfurlable structure of claim 14, further comprising an unfurlable articulated mast.

16. The flexible unfurlable structure of claim 15, wherein the articulated mast is able to be fixed to a platform of a satellite via a rotational-drive motor.

17. The flexible unfurlable structure of claim 14, comprising two solar array half-wings mounted back to back on either side of a mid-plane of the unfurlable structure, the mid-plane being perpendicular to the axis X of unfurling and of refurling of the two half-wings and two independent unfurling and refurling devices respectively dedicated to the two half-wings, the two unfurling and refurling devices comprising two respective rotors, the two rotors having mutually parallel respective axes of rotation.

18. The flexible unfurlable structure of claim 14, comprising a first flexible membrane fixed to the first branch of the bent-in-two tape spring and a second flexible membrane fixed to the second branch of said bent-in-two tape spring, the first flexible membrane supporting first objects and the second flexible membrane supporting second objects different from the first objects.

19. The flexible unfurlable structure according to claim 18, wherein the first objects are solar cells and the second objects are lenses that concentrate the light, and wherein the second flexible membrane is transparent to rays of light.

20. A satellite comprising at least one flexible unfurlable structure of claim 14.

21. The unfurling and refurling device of claim 8, further comprising an unfurling-speed regulating device coupled to the rotor.

22. The unfurling and refurling device of claim 8, further comprising at least one two-dimensional XY flexible membrane, the tape spring being fixed to the flexible membrane parallel to the axis X of unfurling and refurling of the tape spring.

23. The unfurling and refurling device of claim 22, comprising at least two tape springs fixed parallel to one another and parallel to the axis X on the flexible membrane, each tape spring being mounted bent in two, the first end of each tape spring being fixed rigidly to the first anchor point and the second end of each tape spring being fixed rigidly to the second anchor point secured to the rotor.

24. The unfurling and refurling device of claim 23, wherein the flexible membrane comprises lateral battens orthogonal to the axis X, the lateral battens being respectively fixed to each tape spring.

25. The flexible unfurlable structure of claim 19, further comprising an unfurlable articulated mast able to be fixed to a platform of a satellite.

* * * * *